(12) United States Patent
Qian et al.

(10) Patent No.: US 10,237,819 B2
(45) Date of Patent: Mar. 19, 2019

(54) SSIC DEVICE AND LINK CONTROL METHOD FOR SSIC DEVICE

(71) Applicant: Realtek Semiconductor Corporation, Hsinchu (TW)

(72) Inventors: Wei Qian, Jiangsu Province (CN); Guobing Jiang, Jiangsu Province (CN); Chen Shen, Jiangsu Province (CN); Neng-Hsien Lin, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 238 days.

(21) Appl. No.: 15/132,885

(22) Filed: Apr. 19, 2016

(65) Prior Publication Data

US 2016/0360568 A1    Dec. 8, 2016

(30) Foreign Application Priority Data

Jun. 5, 2015 (CN) .......................... 2015 1 0307306

(51) Int. Cl.
*H04L 29/08* (2006.01)
*H04W 52/02* (2009.01)
*H04W 76/19* (2018.01)

(52) U.S. Cl.
CPC ....... *H04W 52/0209* (2013.01); *H04L 67/143* (2013.01); *H04L 69/323* (2013.01); *H04W 76/19* (2018.02); *Y02D 70/00* (2018.01)

(58) Field of Classification Search
CPC . G06F 13/126; G06F 13/4063; H04L 67/143; H04L 69/323; H04W 52/0209;
(Continued)

(56) References Cited

U.S. PATENT DOCUMENTS

| 8,719,475 | B2 * | 5/2014 | Ma | ........................ | G06F 13/426 |
| | | | | | 710/110 |
| 8,872,546 | B2 * | 10/2014 | Zou | .................. | G01R 31/31924 |
| | | | | | 326/39 |

(Continued)

OTHER PUBLICATIONS

Office Action dated Aug. 29, 2016 for the counterpart Taiwan application No. 104126038.

(Continued)

*Primary Examiner* — Alpus Hsu
(74) *Attorney, Agent, or Firm* — WPAT, PC

(57) ABSTRACT

An SSIC (SuperSpeed Inter-Chip) device comprises a detecting circuit operable to execute at least one of a first and a second detection processes and generate a detection result, wherein the first detection process is operable to detect an SSIC compatible object and the second detection process is operable to detect whether the SSIC compatible object satisfies at least one of a de-link state and a re-link state, a control circuit operable to generate a control signal according to the detection result, and a Mobile-Physical-Layer circuit operable to execute at least one of the following steps: if the control signal indicates that the SSIC compatible object is detected and satisfies the de-link state, disconnecting a normal connection between the SSIC device and the SSIC host; and if the control signal indicates that the SSIC compatible object is detected and satisfies the re-link state, connecting the SSIC device with the SSIC host.

13 Claims, 4 Drawing Sheets

(58) Field of Classification Search
CPC ............ H04W 52/0225; H04W 76/028; Y02B 70/126; Y02B 70/3233
See application file for complete search history.

(56) References Cited

U.S. PATENT DOCUMENTS

| | | | |
|---|---|---|---|
| 8,972,646 B2* | 3/2015 | Ranganathan | G06F 13/426 710/305 |
| 9,086,966 B2* | 7/2015 | Wagh | G06F 13/4295 |
| 9,092,367 B2* | 7/2015 | Vadivelu | G06F 13/126 |
| 9,280,510 B2* | 3/2016 | Ranganathan | G06F 13/426 |
| 9,379,497 B2* | 6/2016 | Liu | H01R 13/665 |
| 9,563,260 B2* | 2/2017 | Wagh | H04W 52/0203 |
| 9,652,020 B2* | 5/2017 | Wietfeldt | G06F 1/3206 |
| 9,697,168 B2* | 7/2017 | Ranganathan | G06F 13/4291 |
| 2010/0275037 A1* | 10/2010 | Lee | G06F 13/385 713/189 |
| 2011/0161530 A1* | 6/2011 | Pietri | G06F 13/4022 710/14 |
| 2013/0297833 A1 | 11/2013 | Vadivelu et al. | |
| 2015/0134866 A1 | 5/2015 | Ranganathan et al. | |
| 2015/0324313 A1 | 11/2015 | Lin et al. | |

OTHER PUBLICATIONS

English abstract translation of the Office Action dated Aug. 29, 2016 for the counterpart Taiwan application No. 104126038.
Inter-Chip Supplement to the USB Revision 3.0 Specification, Feb. 11, 2013.

* cited by examiner

SSIC DEVICE AND LINK CONTROL METHOD FOR SSIC DEVICE

BACKGROUND OF THE INVENTION

1. Field of the Invention

The present invention relates to a device and a link control method for inter-chip connection, especially to an SSIC (SuperSpeed Inter-Chip) device and an SSIC device link control method.

2. Description of Related Art

SSIC (SuperSpeed Inter-Chip) technique is open standard technique developed by USB-IF (USB Implementers Forum), characterized by low power consumption and high transmission speed.

A general SSIC device is capable of connecting with an SSIC host under the following four modes:

U0 mode: a full-speed operation mode, allowing the SSIC device to carry out full-speed transmission and reception immediately and therefore consuming the most power among the four modes;

U1 mode: a fast-recovery mode, allowing the SSIC device to reduce power consumption and return to U0 mode quickly;

U2 mode: a slow-recovery mode, allowing the SSIC device to reduce more power consumption and return to U0 mode slowly in comparison with U1 mode; and U3 mode: a sleeping-mode, allowing the SSIC device to achieve the lowest power consumption among the four modes.

In light of the above, although U3 mode consumes the lowest power among the four modes, a general SSIC device is unable to enter U3 mode actively. It is an SSIC host that decided the SSIC device to enter U3 mode. Therefore, even though the SSIC device (e.g., an SSIC card reader) does not connect with an external object (e.g., an SSIC compatible memory card) or the external object cannot be identified or read, the SSIC device is still unable to actively enter U3 mode, or actively stop the transmission/reception function between the SSIC host and it for the reduction in power consumption. It should be noted that the aforementioned SSIC device and the SSIC host could be two parts (e.g., two integrated chips) of an electronic device (e.g., a personal computer, or a mobile device), and could be installed on a circuit board of the electronic device and connected with each other through the wiring of the circuit board or installed on two circuit boards respectively and connected with each other through a connection interface between the two circuit boards. Furthermore, the SSIC device and the SSIC host could be two parts capable of being connected with or independent of each other with an appropriate interface.

People who are interested in the detail of an SSIC device and an SSIC host can refer to the following specification: "Inter-Chip Supplement to the USB Revision 3.0 Specification", Revision 1.01, Feb. 11, 2013".

SUMMARY OF THE INVENTION

In consideration of the problem of the prior art, an object of the present invention is to provide an SSIC (SuperSpeed Inter-Chip) device and an SSIC device link control method capable of making improvement over the prior art.

The present invention discloses an SSIC device capable of actively disconnecting a normal connection between the SSIC device and an SSIC host. An embodiment of the SSIC device comprises a detecting circuit, a control circuit and an M-PHY (Mobile Physical Layer) circuit. The detecting circuit is operable to carry out at least one of a first detection process and a second detection process and generate a detection result accordingly, in which the first detection process is operable to detect an SSIC compatible object and the second detection process is operable to detect whether the SSIC compatible object satisfies a prescribed state including at least one of a de-link state and a re-link state. The control circuit is operable to generate a control signal according to the detection result. The M-PHY circuit is operable to carry out at least one of several steps including the following steps: when the control signal indicates that the SSIC compatible object is detected and satisfies the de-link state, actively disconnecting the normal connection between the SSIC device and the SSIC host according to the control signal; and when the control signal indicates that the SSIC compatible object is detected and satisfies the re-link state, actively connecting the SSIC device with the SSIC host according to the control signal.

The present invention further discloses an SSIC device link control method capable of actively disconnecting a normal connection between an SSIC device and an SSIC host. An embodiment of the method comprises the following steps: carrying out at least one of a first detection process and a second detection process and thereby generating a detection result, in which the first detection process is operable to detect an SSIC compatible object and the second detection process is operable to detect whether the SSIC compatible object satisfies a prescribed state including at least one of a de-link state and a re-link state; generating a control signal according to the detection result; and carrying out at least one of several steps. The several steps includes: when the control signal indicates that the SSIC compatible object is detected and satisfies the de-link state, actively disconnecting the normal connection between the SSIC device and the SSIC host according to the control signal; and when the control signal indicates that the SSIC compatible object is detected and satisfies the re-link state, actively connecting the SSIC device with the SSIC host according to the control signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention field. If any term is defined in this specification, such term should be explained accordingly.

The present invention comprises an SSIC (SuperSpeed Inter-Chip) device and an SSIC device link control method, each of which is capable of actively disconnecting a normal connection between an SSIC device and an SSIC host for the reduction in power consumption. Provided that an alternative means is available and reasonable, people of ordinary skill in the art can use such means similar or equivalent to that described in this specification to carry out the present invention. On account of that some element of the SSIC device of the present invention could be known, the detail of such element will be omitted given that this omission nowhere dissatisfies the requirements for disclosure and enablement. Besides, the SSIC device link control method of the present invention can be in the form of firmware and/or software which could be carried out by the SSIC device of the present invention or the equivalent thereof, and the method will be explained with steps in conjunction with specific hardware. It should be noted that if an implementation derived from one or more of the embodiments in the following, description is practicable, a person of ordinary skill in the art can selectively make use of some or all of the features in one embodiment or selectively make use of the combination of some or all features in several embodiments to have the implementation come true, so as to increase the flexibility of carrying out the present invention.

Figure 1:
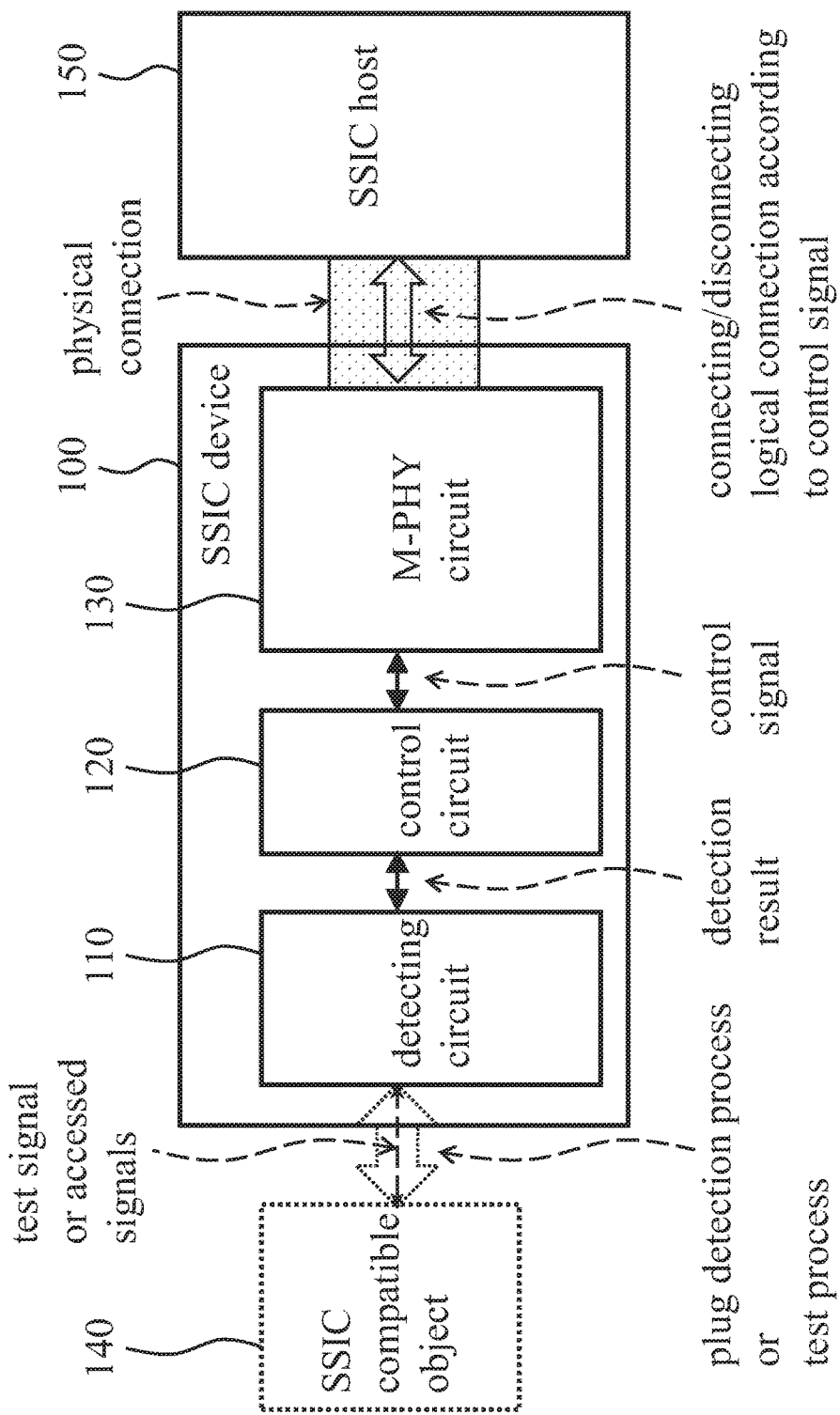
FIG. 1 illustrates an embodiment of the SSIC device of the present invention.

Please refer to FIG. 1 which illustrates an embodiment of the SSIC device of the present invention. As it is shown in FIG. 1, the SSIC device 100 comprises a detecting circuit 110, a control circuit 120 and an M-PHY (Mobile Physical Layer) circuit 130. The detecting circuit 110 is operable to carry out at least one of a first detection process and a second detection process and generate a detection result accordingly, in which the first detection process such as a known or self-developed passive/active plug detection process is operable to detect an SSIC compatible object 140 and the second detection process such as a known or self-developed active/passive test process is operable to detect whether the SSIC compatible object 140 satisfies a prescribed state through the delivery of test signal(s) and/or the comparison of accessed signals. The prescribed state includes at least one of a de-link state and a re-link state. The control circuit 120 is integrated with or independent of the detecting circuit 110, and operable to generate a control signal according to the detection result. The M-PHY circuit 130 is a high speed serial physical interface in compliance with the SSIC specification developed by USB-IF (USB Implementers Forum), and operable to carry out at least one of several steps according to the control signal. The several steps includes: when the control signal indicates that the SSIC compatible object 140 is detected and satisfies the de-link state, actively disconnecting the normal connection between the SSIC device 100 and an SSIC host 150 according to the control signal; and when the control signal indicates that the SSIC compatible object 140 is detected and satisfies the re-link state, actively connecting the SSIC device 100 with the SSIC host 150 according to the control signal. Each of the aforementioned M-PHY circuit 130, the SSIC compatible object 140 and the SSIC host 150 is known, or can be realized through existing or self-developed techniques. It should be noted that the dotted line in FIG. 1 is used to illustrate an object (e.g., the SSIC compatible object 140) and a physical connection relationship that could be absent; the explanation of "actively connecting" includes "actively reconnecting"; and a nonrestrictive example of "normal connection" is "electric/logical connection" distinct from physical connection.

On the basis of the above, there could be one or many kinds of the de-link state. For instance, the de-link state includes at least one of an unidentifiable state, a non-operational state and an externally-interrupted state. The unidentifiable state is true when the SSIC compatible object 140 (e.g., a card inserted into an SSIC card reader, or a data storage component in an SSIC data reader) cannot be identified; the non-operational state is true when the SSIC compatible object 140 (e.g., an object physically connected with an SSIC hub) fails to establish a logical connection with the SSIC device 100, which means that the SSIC compatible object 140 cannot be detected and/or used by the SSIC device 100; and the externally-interrupted state is true when the SSIC compatible object 140 (e.g., an SSIC camera) is disabled by external control (e.g., a button or a switch of the SSIC compatible object 140 turned off by a user or other external force). When the control signal indicates that the SSIC compatible object 140 is detected and satisfies the de-link state, the SSIC device 100 actively disconnects the normal connection with the SSIC host 150 while keeping a physical connection with the SSIC compatible object 140.

Please refer to FIG. 1 again. In an alternative embodiment of the present device invention, the several steps carried out by the M-PHY circuit 130 further include: actively disconnecting the normal connection with the SSIC host 150 according to the control signal when the control signal indicates that the SSIC compatible object 140 (which could be a card removed from an SSIC card reader, or a data storage component removed from an SSIC data reader) is not detected. In an alternative embodiment of the present device invention, the control circuit 120 is further operable to generate the control signal according to a current state of the SSIC device 100, and the several steps further include: keeping the normal connection with the SSIC host 150 according to the control signal when the control signal indicates that the current state of the SSIC device 100 is a sleeping-mode state (e.g., U3 mode defined by the aforementioned SSIC specification) and the SSIC compatible object 140 is not detected. In an alternative embodiment of the present device invention, the control circuit 120 is operable to generate the control signal according to a current state of the SSIC device 100, and the several steps further include: establishing no connection with the SSIC host 150 according to the control signal when the control signal indicates that the SSIC device 100 does not connect with the SSIC host 150 (in a scenario such as the SSIC device 100 just turned on) and the SSIC compatible object 140 is not detected or conforms to the de-link state. In an alternative embodiment of the present device invention, the aforementioned normal connection is associated with one of the following modes: an operation mode (e.g., U0 mode defined by the SSIC specification) operable to make the SSIC device 100 and the SSIC host 150 execute normal transmission and reception; a first power-saving mode (e.g., U1 mode defined by the SSIC specification) operable to reduce power consumption of the SSIC device 100 and/or allow the SSIC device 100 to return to the operation mode within a first duration; and a second power-saving mode operable to save the SSIC device 100 more power and/or allow the SSIC device 100 to return to the operation mode within a second duration, in which the second power-saving mode saves the SSIC device 100 more power in comparison with the first power-saving mode and/or the second duration is longer than the first duration. In an alternative embodiment of the present device invention, both the SSIC device 100 and the SSIC host 150 are included in an SSIC system (e.g., a desktop or portable computer, or a mobile phone), and the physical connection relationship between the SSIC device 100 and the SSIC host 150 is kept unchanged regardless of the detection of the SSIC compatible object 140, that is to say regardless of the existence and non-existence of the SSIC compatible object 140.

Figure 2:
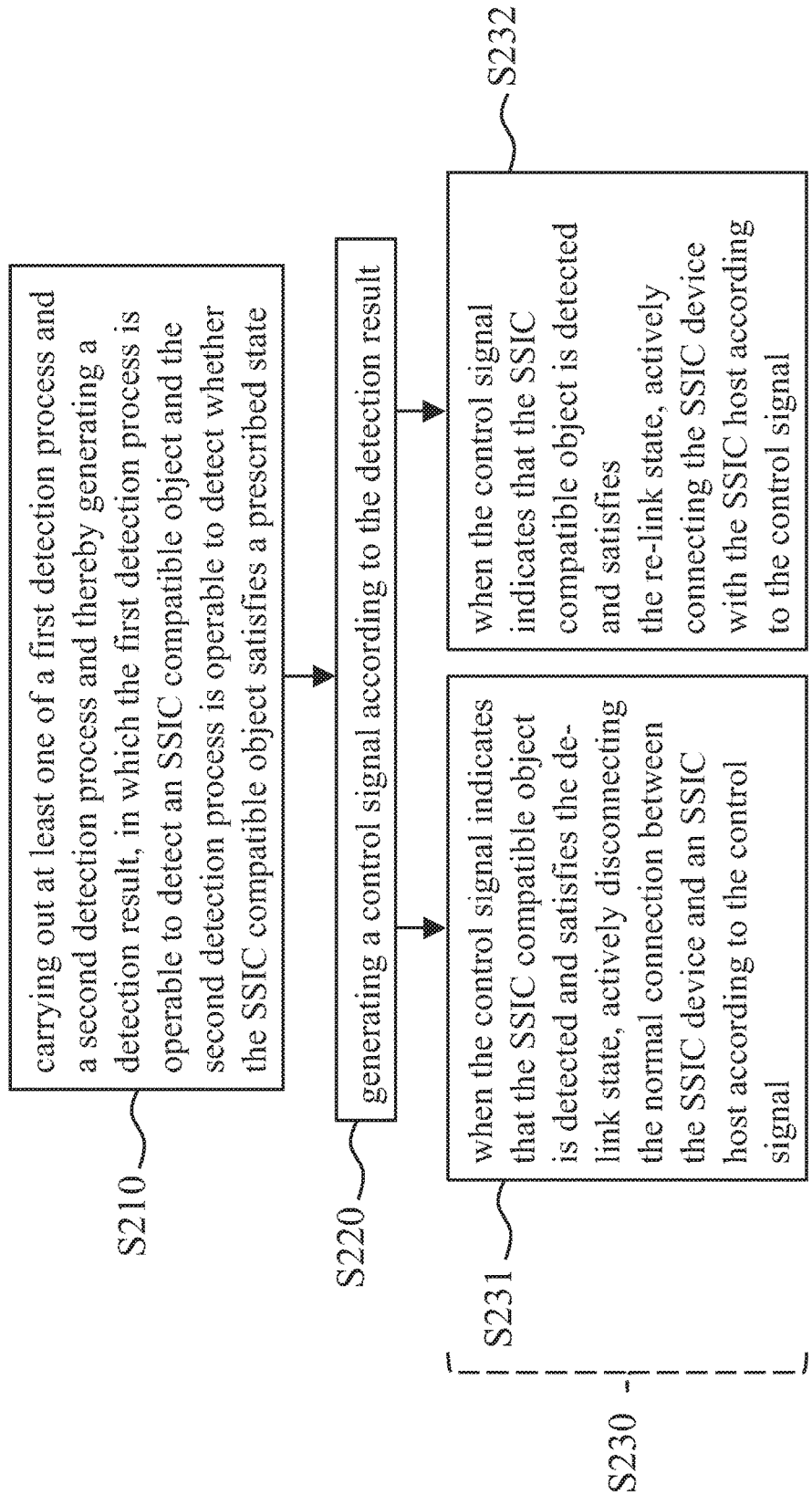
FIG. 2 illustrates an embodiment of the SSIC device link control method of the present invention.

In addition to the above-described SSIC device, the present invention further discloses an SSIC device link control method. As it is shown in FIG. 2, an embodiment of the method comprises the following steps:

Step S210: carrying out at least one of a first detection process and a second detection process and thereby generating a detection result, in which the first detection process is operable to detect an SSIC compatible object and the second detection process is operable to detect whether the SSIC compatible object satisfies a prescribed state including at least one of a de-link state and a re-link state. This step can be carried out by the detecting circuit 110 of FIG. 1 or the equivalent thereof, and the detail or modification of this step can be understood through the preceding paragraphs.

Step S220: generating a control signal according to the detection result. This step can be carried out by the control circuit 120 of FIG. 1 or the equivalent thereof, and the detail or modification of this step can be understood through the preceding paragraphs.

Step S230: carrying out at least one of several steps according to the control signal. The several steps includes: (S231) when the control signal indicates that the SSIC compatible object is detected and satisfies the de-link state, actively disconnecting the normal connection between the SSIC device and an SSIC host according to the control signal; and (S232) when the control signal indicates that the SSIC compatible object is detected and satisfies the re-link state, actively connecting the SSIC device with the SSIC host according to the control signal. This step can be carried out by the M-PHY circuit 130 of FIG. 1 or the equivalent thereof, and the detail or modification of this step can be understood through the preceding paragraphs.

Figure 3:
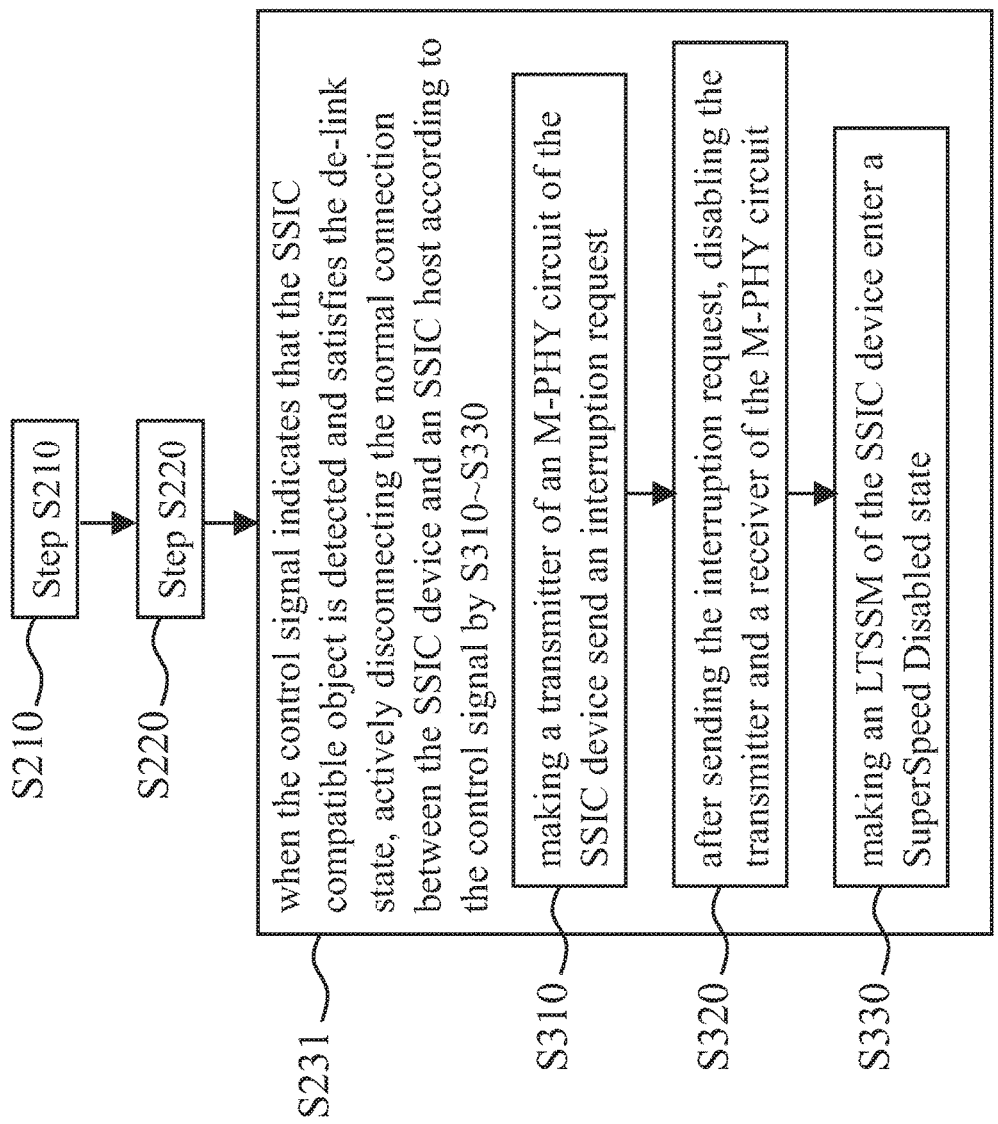
FIG. 3 illustrates another embodiment of the SSIC device link control method of the present invention.

On the basis of the above, in an alternative embodiment of the present method invention, the step (i.e., S231) of actively disconnecting the normal connection between the SSIC device and the SSIC host is carried out by an M-PHY circuit of the SSIC device, and includes the following steps also shown in FIG. 3:

Step S310: making a transmitter of the M-PHY circuit of the SSIC device send an interruption request. For example, this step can make the transmitter send a first differential signal (DIF-N) to thereby enter a Stall state defined by the SSIC specification, and then make the transmitter send a second differential signal (DIF-P) to thereby enter a Line Reset state defined by the SSIC specification. The time for the transmission of the second differential signal DIF-P is not shorter than the time necessary for the Line Reset state, so as to realize the following disabled state.

Step S320: after sending the interruption request, disabling the transmitter and a receiver of the M-PHY circuit of the SSIC device.

Step S330: making an LTSSM (Link Training and Status State Machine) of the SSIC device enter a SuperSpeed Disabled (SS.Disabled) state defined by the SSIC specification. It should be noted that step S330 and step S310 are carried out concurrently in this embodiment. In fact, as long as a consequent implementation is possible and reasonable, the steps of the present method invention are not limited to any specific order.

Figure 4:
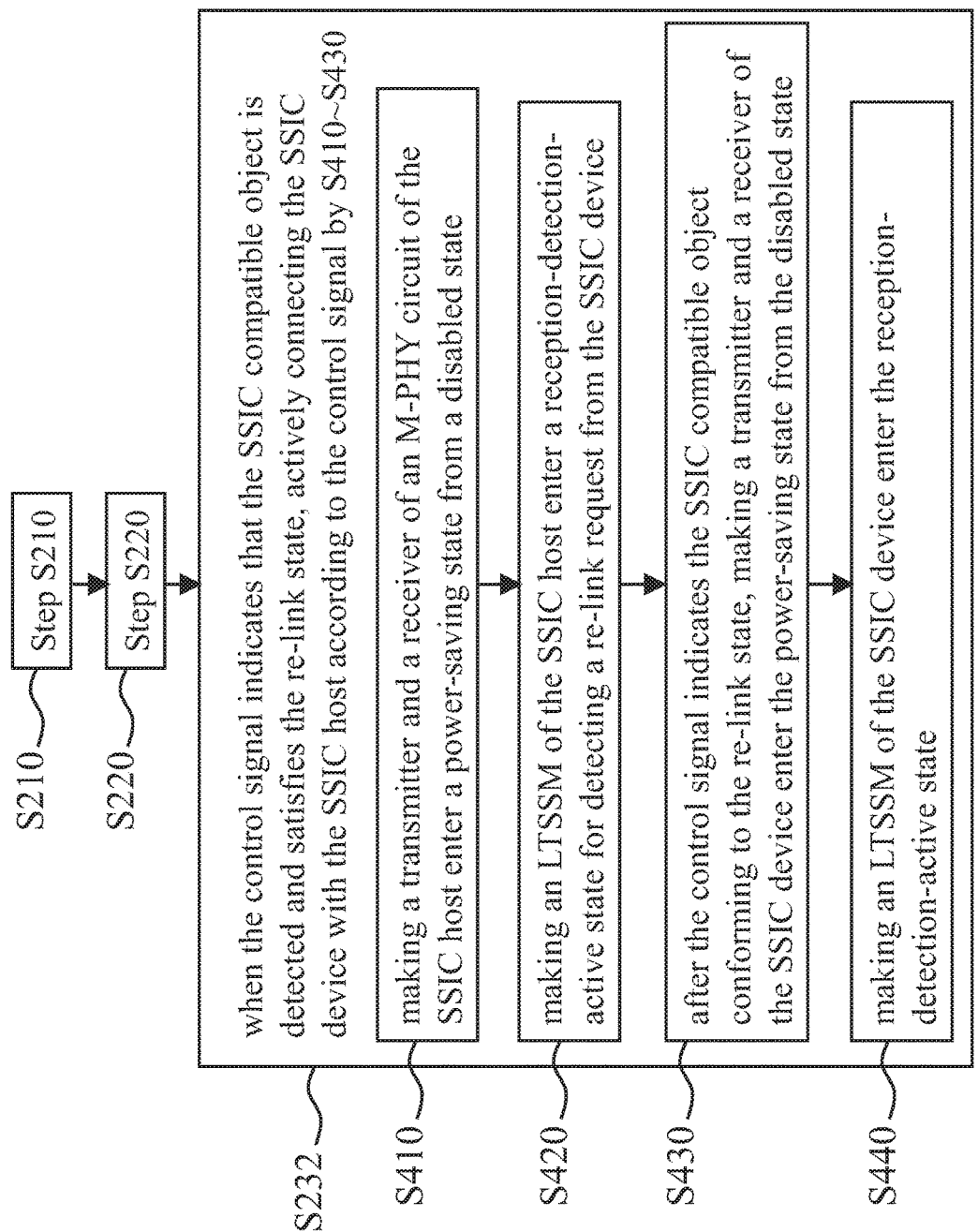
FIG. 4 illustrates a further embodiment of the SSIC device link control method of the present invention.

As it is shown in FIG. 4, in an alternative embodiment of the present method invention, the step (i.e., S232) of actively connecting the SSIC device with the SSIC host includes the following steps:

Step S410: after detecting an interruption request from the SSIC device, making a transmitter and a receiver of an M-PHY circuit of the SSIC host enter a power-saving state (e.g., a HIBERN8 state defined by the SSIC specification) from a disabled state, so as to enter a reception-detection-active (Rx.Detect.Active) state afterwards. The reception-detection-active state is defined by the SSIC specification. This step can be carried out by the SSIC host 150 of FIG. 1 or the equivalent thereof.

Step S420: making an LTSSM of the SSIC host enter the reception-detection-active state for detecting a re-link request from the SSIC device. This step can be carried out by the SSIC host 150 of FIG. 1 or the equivalent thereof.

Step S430: after the control signal indicates that the SSIC compatible object conforms to the re-link state, making a transmitter and a receiver of the SSIC device enter the power-saving state from the disabled state, so as to carry out the subsequent connection action afterwards. This step can be carried out by the SSIC device 100 of FIG. 1 or the equivalent thereof.

Step S440: making an LTSSM of the SSIC device enter the reception-detection-active state, so as to execute the subsequent connection action in compliance with the SSIC specification. This step can be carried out by the SSIC device 100 of FIG. 1 or the equivalent thereof.

Since those of ordinary skill in the art can appreciate the detail and modification of each embodiment by referring to the explanation of all the embodiments, which means that the features of each embodiment can be applied to the other embodiments in an reasonable way, therefore repeated and redundant description is omitted while the existing disclosure is believed to be enough for understanding and enablement.

In summary, the SSIC device and the SSIC device link control method of the present invention allow an SSIC device to actively disconnect a normal connection with an SSIC host for the reduction in power consumption.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An SSIC (SuperSpeed Inter-Chip) device capable of actively disconnecting a logical connection between the SSIC device and an SSIC host, comprising:
   a detecting circuit operable to carry out one of a first detection process and a second detection process and generate a detection result accordingly, in which the first detection process is operable to detect an SSIC compatible object, the second detection process is operable to detect whether the SSIC compatible object satisfies a prescribed state including at least one of a de-link state and a re-link state, and the SSIC compatible object is a memory card, a data storage component or a camera;
   a control circuit operable to generate a control signal according to the detection result; and
   an M-PHY (Mobile Physical Layer) circuit operable to carry out at least one of several steps including following steps:
      provided that the logical connection between the SSIC device and the SSIC host has been established, when the control signal indicates that the SSIC compatible object is detected and satisfies the de-link state, actively disconnecting the logical connection between the SSIC device and the SSIC host according to the control signal; and provided that the logical connection between the SSIC device and the SSIC host has been disconnected, when the control signal indicates that the SSIC compatible object is detected and satisfies the re-link state, actively re-establishing the logical connection between the SSIC device and the SSIC host according to the control signal, wherein the SSIC device and the SSIC host are kept physically connected when the logical connection is disconnected, the first detection process is a plug detection process and the second detection process is a test process for detecting whether the SSIC compatible object satisfies the prescribed state by performing at least one of delivering a test signal and comparing accessed signals.

2. The SSIC device of claim 1, wherein the de-link state includes at least one of an unidentifiable state, a non-operational state and an externally-interrupted state, and when the control signal indicates that the SSIC compatible object is detected and satisfies the de-link state, the SSIC device actively disconnects the logical connection with the SSIC host while keeping a physical connection with the SSIC compatible object.

3. The SSIC device of claim 1, wherein the several steps further include a step of actively disconnecting the logical connection with the SSIC host according to the control signal when the control signal indicates that the SSIC compatible object is not detected.

4. The SSIC device of claim 1, wherein the control circuit is further operable to generate the control signal according to detection of a current state of the SSIC device, and the several steps further include a step of keeping the logical connection with the SSIC host according to the control signal when the control signal indicates that the current state of the SSIC device is a sleeping-mode state and the SSIC compatible object is not detected.

5. The SSIC device of claim 1, wherein the control circuit is further operable to generate the control signal according to detection of a current state of the SSIC device, and the several steps further include a step of stopping establishing the logical connection with the SSIC host according to the control signal when the control signal indicates that the logical connection between the SSIC device and the SSIC host is not yet established and the SSIC compatible object is not detected or conforms to the de-link state.

6. The SSIC device of claim 1, wherein the logical connection is associated with one of following modes: an operation mode operable to make the SSIC device and the SSIC host execute normal transmission and reception; a first power-saving mode operable to reduce power consumption of the SSIC device; and a second power-saving mode operable to save the SSIC device more power in comparison with the first power-saving mode.

7. The SSIC device of claim 1, wherein both the SSIC device and the SSIC host are included in an SSIC system, and a physical connection relationship between the SSIC device and the SSIC host is kept unchanged regardless of detection of the SSIC compatible object.

8. An SSIC (SuperSpeed Inter-Chip) device link control method capable of actively disconnecting a logical connection between an SSIC device and an SSIC host, comprising:

carrying out one of a first detection process and a second detection process and thereby generating a detection result, in which the first detection process is operable to detect an SSIC compatible object, the second detection process is operable to detect whether the SSIC compatible object satisfies a prescribed state including at least one of a de-link state and a re-link state, and the SSIC compatible object is a memory card, a data storage component or a camera;

generating a control signal according to the detection result; and carrying out at least one of several steps including following steps:

provided that the logical connection between the SSIC device and the SSIC host has been established, when the control signal indicates that the SSIC compatible object is detected and satisfies the de-link state, actively disconnecting the logical connection between the SSIC device and the SSIC host according to the control signal; and provided that the logical connection between the SSIC device and the SSIC host has been disconnected, when the control signal indicates that the SSIC compatible object is detected and satisfies the re-link state, actively re-establishing the logical connection between the SSIC device and the SSIC host according to the control signal, wherein the SSIC device and the SSIC host are kept physically connected when the logical connection is disconnected, the first detection process is a plug detection process and the second detection process is a test process for detecting whether the SSIC compatible object satisfies the prescribed state by performing at least one of delivering a test signal and comparing accessed signals.

9. The SSIC device link control method of claim 8, wherein the de-link state includes at least one of an unidentifiable state, a non-operational state and an externally-interrupted state, and when the control signal indicates that the SSIC compatible object is detected and satisfies the de-link state, the SSIC device is made to actively disconnect the logical connection with the SSIC host while keeping a physical connection with the SSIC compatible object.

10. The SSIC device link control method of claim 8, wherein the several steps further include a step of actively disconnecting the logical connection with the SSIC host according to the control signal when the control signal indicates that the SSIC compatible object is not detected.

11. The SSIC device link control method of claim 8, wherein the step of generating the control signal includes a step of generating the control signal according to detection of a current state of the SSIC device, and the several steps further include a step of keeping the logical connection with the SSIC host according to the control signal when the control signal indicates that the current state of the SSIC device is a sleeping-mode state and the SSIC compatible object is not detected.

12. The SSIC device link control method of claim 8, wherein the step of generating the control signal includes a step of generating the control signal according to detection of a current state of the SSIC device, and the several steps further include a step of establishing no connection with the SSIC host according to the control signal when the control signal indicates that the SSIC device does not connect with the SSIC host and the SSIC compatible object is not detected or conforms to the de-link state.

13. The SSIC device link control method of claim 8, wherein the logical connection is associated with one of following modes: an operation mode operable to make the SSIC device and the SSIC host execute normal transmission and reception; a first power-saving mode operable to reduce power consumption of the SSIC device and allow the SSIC device to return to the operation mode within a first duration; and a second power-saving mode operable to reduce power consumption of the SSIC device and allow the SSIC device to return to the operation mode within a second duration which is longer than the first duration.

* * * * *